(12) United States Patent
Matsuoka

(10) Patent No.: US 7,477,436 B2
(45) Date of Patent: Jan. 13, 2009

(54) SCANNING OPTICAL SYSTEM

(75) Inventor: Shohei Matsuoka, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/054,674

(22) Filed: Mar. 25, 2008

(65) Prior Publication Data
US 2008/0239439 A1   Oct. 2, 2008

(30) Foreign Application Priority Data
Mar. 30, 2007   (JP) .............................. 2007-091294

(51) Int. Cl.
G02B 26/08 (2006.01)
(52) U.S. Cl. ...................... 359/196; 359/216
(58) Field of Classification Search ................ 359/196, 359/205, 212, 216; 347/241
See application file for complete search history.

(56) References Cited

U.S. PATENT DOCUMENTS

| 5,111,219 A | 5/1992 | Makino |
| 5,808,773 A | 9/1998 | Ono |
| 6,101,018 A * | 8/2000 | Naiki et al. .................. 359/216 |
| 6,133,935 A | 10/2000 | Fujibayashi et al. |
| 2006/0126147 A1 | 6/2006 | Takakubo |
| 2007/0081218 A1 | 4/2007 | Matsuoka |
| 2007/0091405 A1 | 4/2007 | Matsuoka |
| 2007/0159675 A1 | 7/2007 | Matsuoka |
| 2007/0165100 A1 | 7/2007 | Shinozaki |

FOREIGN PATENT DOCUMENTS

| JP | 4-50908 | 2/1992 |
| JP | 8-240768 | 9/1996 |
| JP | 10-232347 | 9/1998 |
| JP | 3035993 | 2/2000 |

* cited by examiner

Primary Examiner—Euncha P Cherry
(74) Attorney, Agent, or Firm—Greenblum & Bernstein, P.L.C.

(57) ABSTRACT

A scanning optical system configured to scan laser light on a scanned surface in a scanning direction, includes a light source emitting the laser light, a converging element converging the emitted laser light in the predetermined scanning direction, a deflector deflecting the converged laser light to scan the laser light on the scanned surface, and a scanning speed controlling element controlling the deflected laser light to be scanned at a constant scanning speed. The scanning optical system is configured to satisfy predetermined conditions.

10 Claims, 4 Drawing Sheets

SCANNING OPTICAL SYSTEM

BACKGROUND OF THE INVENTION

The following description relates to one or more scanning optical systems configured to be incorporated in an image forming device.

A conventional scanning optical system has generally been configured as follows. Laser light emitted by a light source is converted into parallel light through a collimating lens, and thereafter made incident onto a deflector. The light deflected by the deflector is scanned in a predetermined direction on a scanned surface at a constant speed maintained via an fθ lens group. The conventional scanning optical system has usually been configured with a polygon mirror employed as a deflector. In recent years, a scanning optical system is required to be miniaturized to meet a requirement for downsizing an image forming device. Thus, as exemplified in Japanese Patent Provisional Publication No. HEI 10-232347 (hereinafter referred to as '347 Publication), there has recently been proposed a scanning optical system which can be miniaturized.

It is noted that a direction in which the laser light deflected by the deflector is scanned on the scanned surface will be defined as a main scanning direction in the following description. Additionally, a direction perpendicular to an optical axis of the scanning optical system and the main scanning direction will be defined as an auxiliary scanning direction. Each direction used when describing elements other than the scanned surface will be determined based on the directions defined on the scanned surface.

The scanning optical system disclosed in '347 Publication is provided with a converging lens as substitute for the collimating lens so as to convert the laser light emitted by the light source not into parallel light but into light converged in the main scanning direction. Thereby, a back focus of the scanning optical system is shortened so as to maintain a focal length of the scanning optical system and to hardly reduce a scanning amount with respect to a rotation angle of the polygon mirror. Consequently, a field angle required for the fθ lens group provided between the polygon mirror and scanned surface is constrained, and therefore the scanning optical system can be miniaturized, keeping favorable optical performances.

In case of using the polygon mirror as the deflector, there is known such a phenomenon that an incident point, namely, a reflection point of the laser light on the polygon mirror (hereinafter referred to as a deflection point) is slightly shifted during a single scanning operation. The positional shift of the deflection point is caused due to an effect of the polygon mirror in which plane deflection surfaces are rotated, with a value up to a radius difference between an inscribed circle and a circumscribed circle of the polygon mirror. When using the converged light, the shift of the deflection point causes an asymmetric scanning trajectory with respect to the optical axis of the fθ lens group, or more specifically, an asymmetric aberration (note: the scanning trajectory represents a trajectory of an imaging point of the converged light deflected by the polygon mirror, which imaging point is defined under the assumption that the converged light is not transmitted through the fθ lens group, as shown in FIG. 6). Therefore, the scanning optical system disclosed in '347 Publication employs the fθ lens group designed such that power allocation thereof in the main scanning direction is asymmetric with respect to the optical axis thereof, in order to overcome the aforementioned asymmetric aberration.

However, when using the fθ lens group with the asymmetric power allocation disclosed in '347 Publication, an allowable margin of location error of each optical element such as the fθ lens group and coupling lens group provided between the light source and polygon mirror is narrower. In other words, the optical performances of the entire scanning optical system are very sensitive to a positional error of each optical element dislocation. Namely, a minute positional error caused when each element is attached results in unacceptable level of astigmatism and shift of the scanned position on the scanned surface.

SUMMARY OF THE INVENTION

The present invention is advantageous in that there can be provided one or more improved scanning optical systems that can widen an allowable margin of positional error of each optical element and attain favorable optical performances even with maintaining a small size thereof.

According to aspects of the present invention, there is provided a scanning optical system configured to scan laser light on a scanned surface in a scanning direction, which includes a light source configured to emit the laser light, a converging element configured to converge the laser light emitted by the light source in the predetermined scanning direction, a deflector configured to deflect the laser light converged by the converging element so as to scan the laser light on the scanned surface in the predetermined scanning direction, and a scanning speed controlling element configured to control the laser light deflected by the deflector to be scanned on the scanned surface at a constant scanning speed. The scanning optical system is configured to satisfy conditions (1) and (2):

$$f > -K/M \qquad (1)$$

$$\frac{W}{2\sin\alpha} > f(2 - M/m) - K/m > \frac{dW}{2K\sin\alpha} \qquad (2)$$

where f represents a focal length of the converging element, K represents a scanning coefficient of the scanning speed controlling element, M represents a magnification of the scanning optical system in the predetermined scanning direction, W represents a scanning width of the laser light on the scanned surface, a represents an angle, on a scanning plane of the laser light deflected by the deflector in the predetermined scanning direction, between an optical axis of optical elements provided between the light source and deflector and the optical axis of the scanning speed controlling element, m represents a magnification of the scanning speed controlling element in the predetermined scanning direction, and d represents a distance from the deflector to the scanning speed controlling element.

Optionally, the scanning optical system may be configured to satisfy a condition (3):

$$-0.01 < \frac{\Delta}{H} < 0.01 \qquad (3)$$

where Δ represents a shift amount of a deflection point at the deflector determined by an equation:

$$\Delta = \frac{\varphi \sin\alpha}{2}\left\{\frac{1}{\cos\left(\frac{\alpha}{2}\right)} - \frac{1}{\cos\left(\frac{\alpha}{2} + \frac{W}{4K}\right)}\right\}$$

and H represents a distance from the optical axis of the scanning speed controlling element to a farther end of a scanning trajectory of an imaging point of the converged light deflected by the deflector in the main scanning plane, the imaging point being defined under an assumption that the converged light is not transmitted through the scanning speed controlling element, the distance being determined by an equation:

$$H = \frac{K\sin\left(\frac{W}{2K}\right)}{m}$$

where φ represents a diameter of an inscribed circle of the deflector.

Optionally, the scanning optical system may be configured to satisfy conditions (4) and (5):

$$0 < m < 0.5 \tag{4}$$

$$K > W/2 \tag{5}$$

Optionally, the light source may include a chip and a plurality of laser emitters arranged on the chip away from each other in the predetermined scanning direction.

Optionally, the converging element may include a converging lens group.

Optionally, the scanning speed controlling element may include a scanning speed controlling lens group.

BRIEF DESCRIPTION OF THE ACCOMPANYING DRAWINGS

FIG. 1 schematically shows a configuration of a scanning optical system in an embodiment according to one or more aspects of the present invention.

DETAILED DESCRIPTION OF THE EMBODIMENTS

Figure 1:
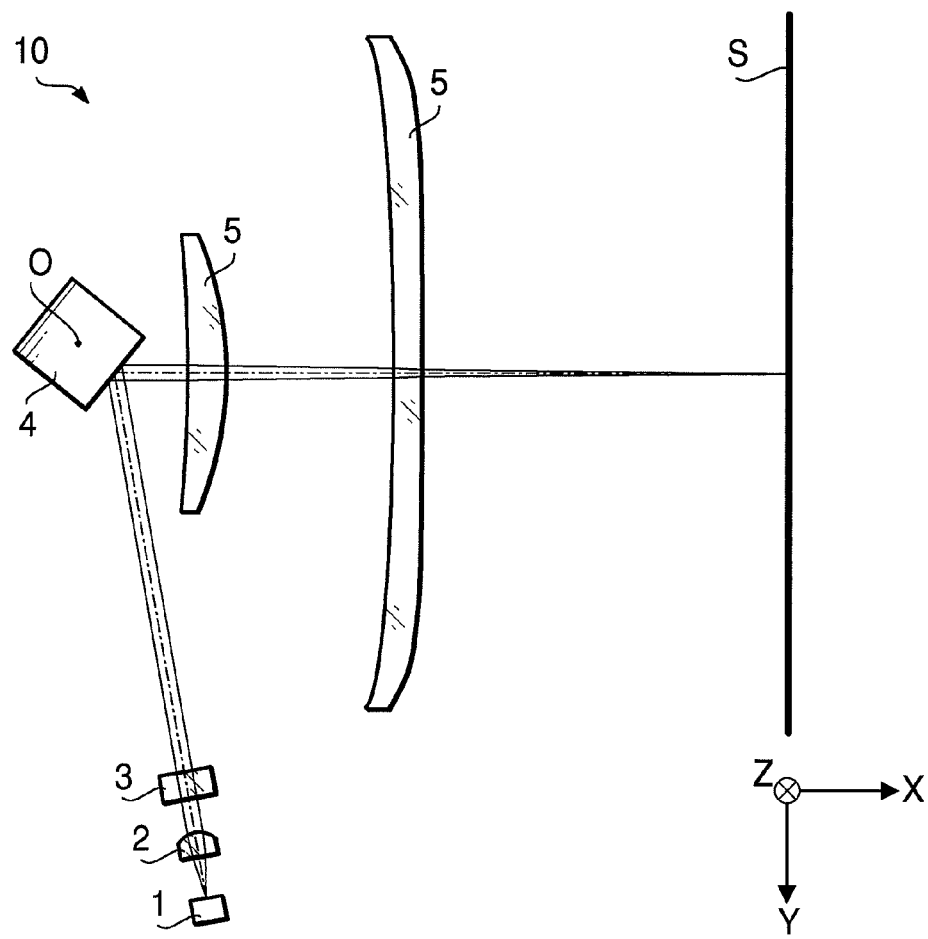

FIG. 1 schematically shows a configuration of a scanning optical system 10 in a normally used state in an embodiment according to aspects of the present invention, which is provided in an image forming device. As shown in FIG. 1, the scanning optical system 10 is provided with an optical source 1, coupling lens group 2, cylindrical lens group 3, polygon mirror 4, and fθ lens group 5. A reference character S shown in FIG. 1 indicates a scanned surface such as a photoconductive drum of the image forming device.

It is noted that, in the following description, a main scanning direction is defined as Y direction, an auxiliary scanning direction as Z direction, and a direction perpendicular to the Y and Z directions, that is, an optical axis direction of the fθ lens group as X direction.

In case of using the scanning optical system 10, an operation of scanning laser light on the scanned surface S is as follows. Laser light emitted by the optical source 1 is firstly incident onto the coupling lens group 2. The coupling lens group 2 has a power to converge the incident laser light at least in the main scanning direction. The laser light transmitted through the coupling lens group 2 is then incident onto the cylindrical lens group 3. The cylindrical lens group 3 has a power to converge the incident laser light in the auxiliary scanning direction. The laser light transmitted through the cylindrical lens group 3 is converged in the auxiliary scanning direction immediately prior to reaching the polygon mirror 4.

The laser light converged in the auxiliary scanning direction is incident onto the polygon mirror 4. The polygon mirror 4 has a plurality of deflection surfaces rotated around a center axis O. The laser light deflected by each deflection surface is directed to the fθ lens group 5.

The laser light transmitted through the fθ lens group 5 is scanned in the main scanning direction (Y direction) on the scanned surface S with a constant scanning speed being maintained. It is noted that the fθ lens group 5 of the present embodiment is configured with two lenses, yet the configuration is just an example, and the fθ lens group 5 according to aspects of the present invention is not limited to such a configuration.

Thus, according to the scanning optical system 10 of the present embodiment, the converged light is caused to be incident onto the polygon mirror 4 by the coupling lens group 2. It is noted that the converged light, which will simply be referred to in the following description, will indicate laser light converged at least in the main scanning direction. By letting the converged light incident onto the polygon mirror 4, a focal length of the coupling lens group 2 is not definitely determined depending on a focal length of the fθ lens group 5. Specifically, in the present embodiment, even though the focal length of the fθ lens group 5 is set to be short so as to downsize the scanning optical system 10, it is possible to set the focal length of the coupling lens group 2 to be such an appropriate value that the positional error in the attachment of the coupling lens group 2 has less effect on optical performances of the coupling lens group 2, when following conditions (1) and (2) are satisfied:

$$f > -K/M \tag{1}$$

$$\frac{W}{2\sin\alpha} > f(2 - M/m) - K/m > \frac{dW}{2K\sin\alpha} \tag{2}$$

where "f" represents the focal length of the coupling lens group 2, "K" represents a scanning coefficient of the fθ lens group 5, "M" represents a magnification of the entire scanning optical system 10 in the main scanning direction, "W" represents a scanning width of the laser light on the scanned surface S, "α" represents an angle, on a main scanning plane of the laser light deflected by the polygon mirror 4 in the main scanning direction, between an optical axis of the optical system provided between the light source 1 and polygon mirror 4 and the optical axis of the fθ lens group 5, "m" represents a magnification of the fθ lens group 5 in the main scanning direction, and "d" represents a distance from the polygon mirror 4 to a first surface of the fθ lens group 5. It is noted that the scanning coefficient K is a value given as ΔY/Δθ in case where a unit deflection angle by the polygon mirror 4 is defined as Δθ, and ΔY is a scanning amount per the unit deflection angle Δθ on the scanned surface S. The scanning coefficient K is substantially equivalent to the focal length of the fθ lens group 5 when the fθ lens group 5 has a small magnification. Furthermore, the deflection angle represents an angle between the laser light deflected by the polygon mirror 4 and the optical axis of the fθ lens group 5.

Figure 2:
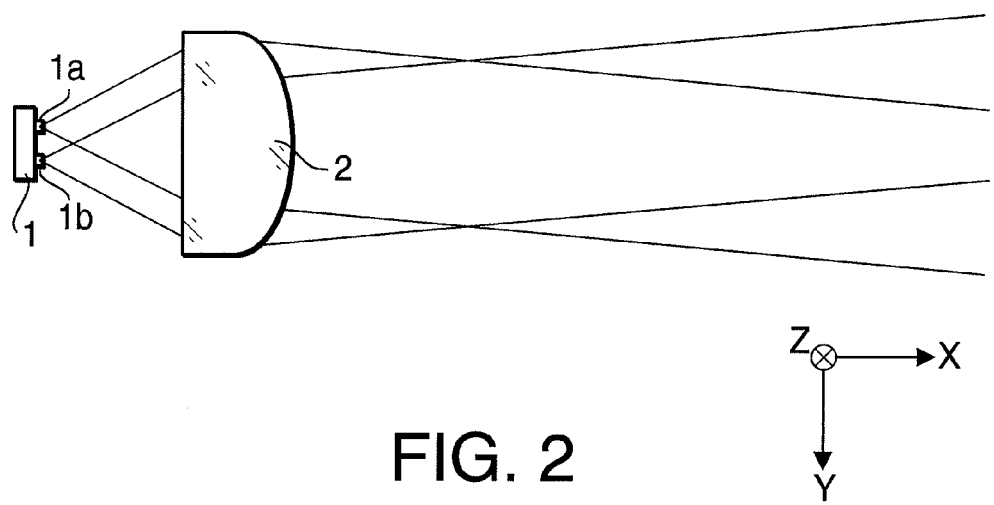
FIG. 2 is an enlarged view around a light source of the scanning optical system in the embodiment according to one or more aspects of the present invention.
Figure 3:
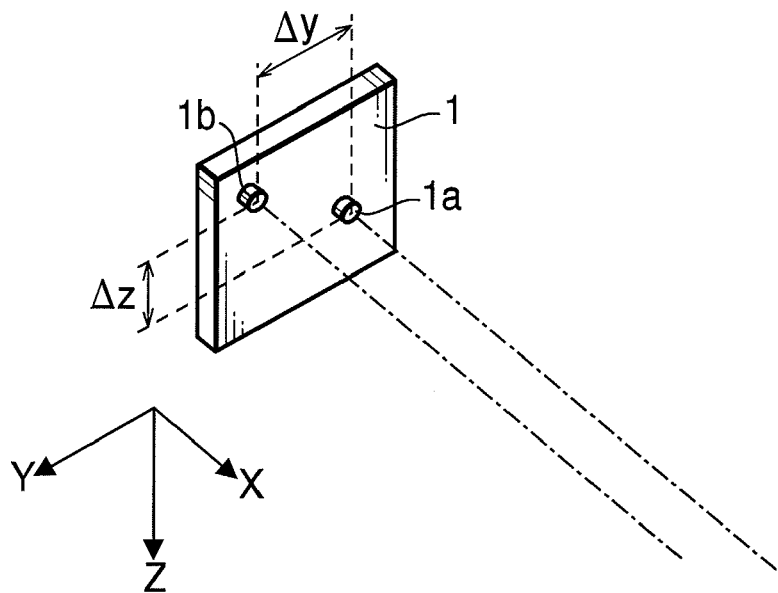
FIG. 3 is a perspective view schematically showing the light source in the embodiment according to one or more aspects of the present invention.

The optical source 1 of the present embodiment is premised on a light source with a single laser emitter, yet the optical source 1 may have a plurality of laser emitters. FIG. 2 is an enlarged view around a light source 1 with two laser emitters. FIG. 3 is a perspective view schematically showing the light source 1 shown in FIG. 2. The light source 1 shown in FIG. 2 or 3 has the two laser emitters 1a and 1b on a single chip. When using such a light source 1, the scanning optical system 10 of the present embodiment can be used as a multi-beam optical system. The laser emitters 1a and 1b of the light source 1 are arranged with a small positional difference (Δy or Δz) therebetween in each of the Y and Z directions such that laser light emitted by each of the laser emitters 1a and 1b can perform accurate even drawing on the scanned surface S. In addition, when a plurality of lines are concurrently scanned with the plurality of laser light beams by using the light source 1 shown in FIG. 2 or 3, positional deviation between the laser emitters and the optical axis of the coupling lens group 2, which is an intrinsic phenomenon, cannot be avoided. Hence, it is significant to reduce an effect provided due to the positional deviation, for example, to reduce a curvature of field.

Figure 6:
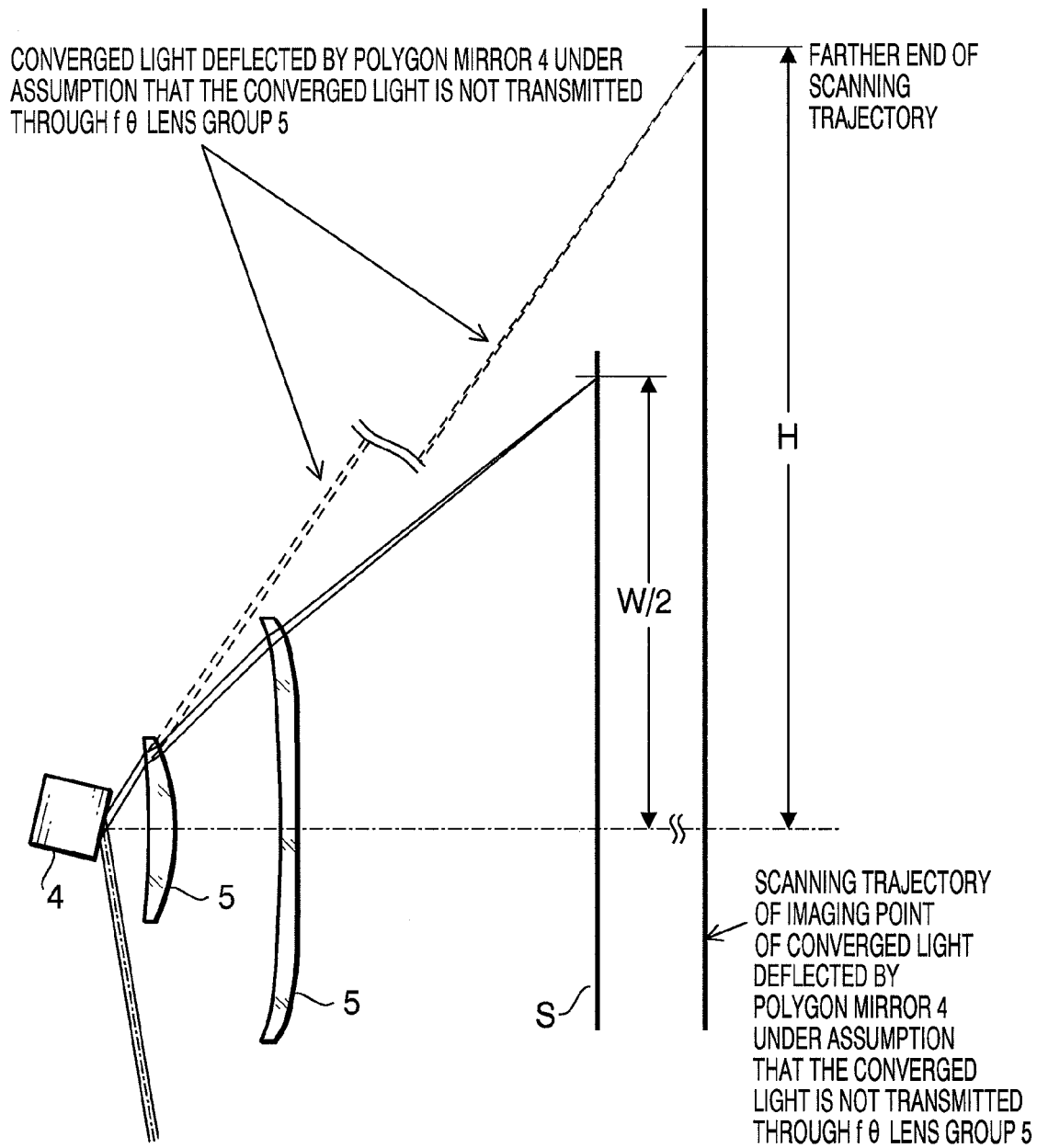
FIG. 6 is an illustration for explaining a scanning trajectory of an imaging point of converged light deflected by a polygon mirror.

Further, as described above, there is known a fact that a so-called deflection point is shifted during a scanning operation using the polygon mirror as a means for deflecting the laser light. The shift of the deflection point causes an asymmetric scanning trajectory with respect to the optical axis of the fθ lens group when the converged light is incident onto the polygon mirror (note: the scanning trajectory represents a trajectory of an imaging point of the converged light deflected by the polygon mirror, which imaging point is defined under the assumption that the converged light is not transmitted through the fθ lens group, as shown in FIG. 6). Furthermore, the shift of the deflection point results in that an asymmetric error of the scanning speed is more likely to be caused. In order to avoid the above phenomena, the scanning optical system 10 of the present embodiment is configured to satisfy a following condition (3):

$$-0.01 < \frac{\Delta}{H} < 0.01 \tag{3}$$

where "Δ" represents a shift amount of the deflection point determined by a following equation:

$$\Delta = \frac{\varphi \sin\alpha}{2} \left\{ \frac{1}{\cos\left(\frac{\alpha}{2}\right)} - \frac{1}{\cos\left(\frac{\alpha}{2} + \frac{W}{4K}\right)} \right\}$$

"H" represents a distance from the optical axis of the fθ lens group to a farther end of the scanning trajectory in the main scanning plane (see FIG. 6), which distance is determined by a following equation:

$$H = \frac{K \sin\left(\frac{W}{2K}\right)}{m}$$

and "φ" represents a diameter of an inscribed circle of the polygon mirror.

To satisfy the condition (3) means that a symmetric property of the scanning trajectory is maintained. Therefore, with the condition (3) being satisfied, even though the fθ lens group 5 is designed to be symmetric with respect to the optical axis thereof, the asymmetric property of the scanning trajectory can substantially be ignored. The fθ lens group 5 designed to be symmetric can widen an allowable margin of positional error in mounting the fθ lens group 5. It is noted that it is possible to attain substantially the same optical performances as a case where the parallel light is incident onto the fθ lens group 5 designed to be symmetric, by setting Δ/H within a range of −0.005 to +0.005.

In order to satisfy the above conditions (1) to (3), it is desired to appropriately set each parameter so as to satisfy following conditions (4) and (5).

$$0 < m < 0.5 \tag{4}$$

$$K > W/2 \tag{5}$$

When each parameter is set so as to satisfy the above conditions (4) and (5), such a configuration as to satisfy the aforementioned conditions (1) to (3) can easily be attained. Incidentally, when the conditions (4) and (5) are not satisfied, the fθ lens group 5 is configured with too high power and too large field angle, and thus it causes an undesired situation that it is difficult to carry out correction of aberration, particularly, correction for achieving the constant scanning speed (namely, reduction of scanning speed error).

Subsequently, there will be explained a concrete practical example in the present embodiment. The scanning optical system 10 in the practical example is shown in FIG. 1. There are shown in Table 1, specifications of the scanning optical system 10 in the practical example and a scanning optical system in a comparison example. It is noted that, in the scanning optical system in the comparison example, the laser light incident onto coupling lens group is converted into parallel light. That is, in the scanning optical system in the comparison example, the coupling lens group serves as a collimating lens group.

TABLE 1

|  | Practical Example | Comparison Example |
|---|---|---|
| Focal length f of coupling lens group 2 [mm] | 10.375 | 9.256 |
| Fno of coupling lens group 2 | 5.000 | 5.000 |
| Magnification of coupling lens group 2 | −71.176 | — |
| Distance from light source 1 to coupling lens group 2 [mm] | 10.521 | 9.256 |
| Distance from coupling lens group 2 to polygon mirror 4 [mm] | 90.000 | 105.000 |
| Incident angle on polygon mirror 4 [°] | 85.000 | 85.000 |
| Distance from polygon mirror 4 to object point of coupling lens group 2 [mm] | 658.824 | ∞ |
| Scanning coefficient K of fθ lens group 5 [mm] | 112.000 | 112.000 |

TABLE 1-continued

|  | Practical Example | Comparison Example |
|---|---|---|
| Fno of fθ lens group 5 | 60.500 | 60.500 |
| Magnification m of fθ lens group 5 | 0.170 | — |
| Focal point location at back of image plane of fθ lens group 5 [mm] | 143.700 | ∞ |
| Scanning width [mm] | 216.000 | 216.000 |
| Distance d from polygon mirror 4 to fθ lens group 5 [mm] | 11.340 | 11.340 |
| Magnification M of entire system | −12.100 | −12.100 |
| Diameter φ of inscribed circle of polygon mirror 4 [mm] | 14.140 | 14.140 |

Additionally, there are shown in Table 2, each parameter value in the practical example which is calculated based on the specifications shown in Table 1.

TABLE 2

| Condition (2) | |
|---|---|
| W/2sinα | 108.413 |
| f(2 − M/m) − K/m | 100.375 |
| (d/K)W/2sinα | 10.977 |
| Condition (3) | |
| Δ | −2.274 |
| Δ/H | −0.004 |

As shown in Table 2, both the conditions (2) and (3) are satisfied in the practical example. In addition, it is understood from Table 2 that the conditions (1), (4), and (5) are satisfied in the practical example. Thus, the aforementioned all conditions, particularly, the conditions (2) and (3) are satisfied in the practical example. Therefore, it is possible to efficiently suppress asymmetric aberration to be caused on the scanned surface S in the practical example. Consequently, the fθ lens group 5 can be configured to be symmetric with respect to the optical axis thereof. Incidentally, when trying to downsize a multi-beam scanning optical system, it is desired that the scanning optical system is configured so as not to extend beyond a width of an image-formed medium (such as a paper) usable for an image forming device in which the scanning optical system is mounted. The width of the paper is substantially identical to a scanning width of the multi-beam scanning optical system. In the practical example, as shown in Table 1, the scanning optical system 10 is downsized with the distance from the light source 1 to the polygon mirror 4 via the coupling lens group 2 shorter than half of the scanning width.

Figure 4:
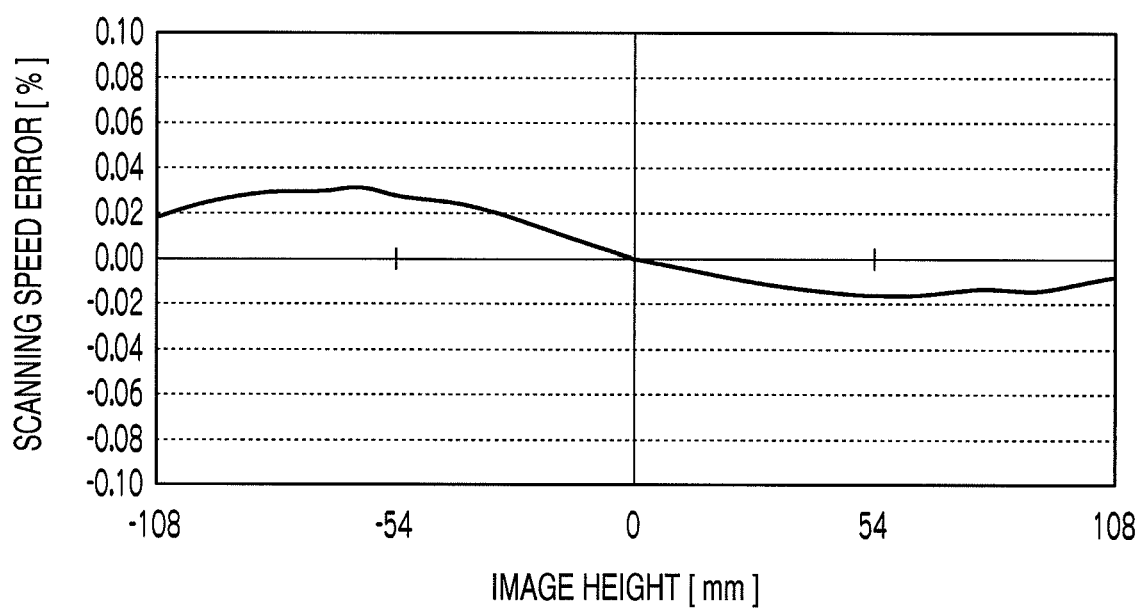
FIG. 4 shows relationship between an image height of the scanning optical system and an error of a scanning speed in a practical example in the embodiment according to one or more aspects of the present invention.

Hereinafter, there will be verified performances of the scanning optical system 10 in the practical examples that satisfies all of the conditions (1) to (5). FIG. 4 shows relationship between an image height of the scanning optical system 10 and an error of the scanning speed in the practical example. As shown in FIG. 4, the scanning operation is performed substantially with a constant speed over an image height range of −108 [mm] to 108 [mm].

Figure 5:
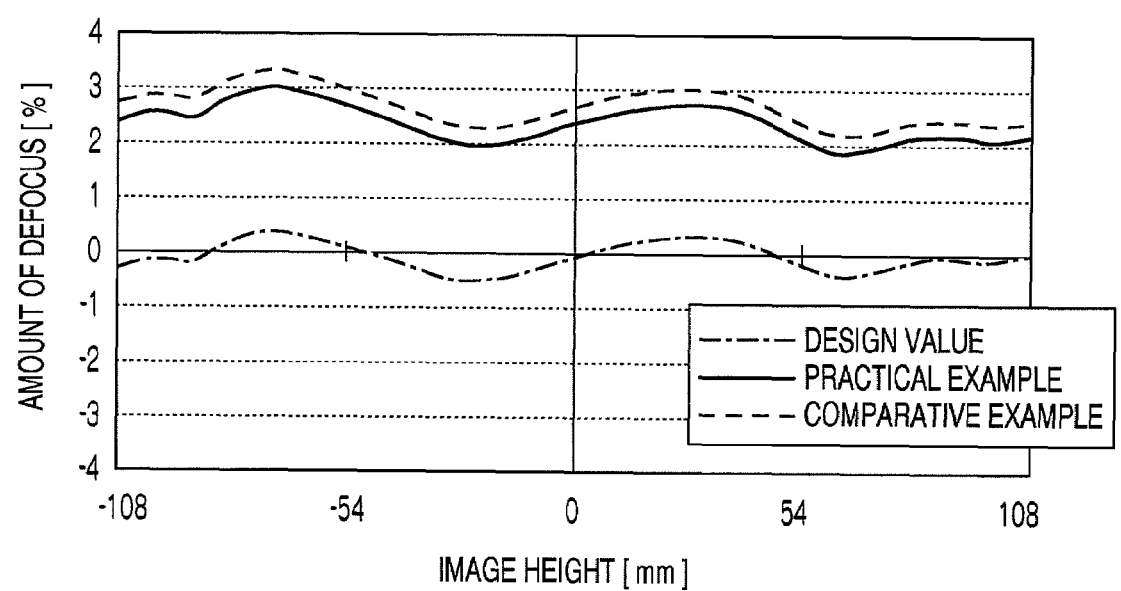
FIG. 5 shows relationship between the image height and an amount of defocus in a main scanning direction in the practical example in the embodiment according to one or more aspects of the present invention.

FIG. 5 shows relationship between the image height and an amount of defocus (namely, deviation of the focal point from the scanned surface S) in the main scanning direction. In FIG. 5, an alternate long and short dash line indicates an ideal property of a scanning optical system configured based on the design values. A solid line indicates a property of the scanning optical system 10 with the coupling lens group 2 decentered from the optical axis of the entire system by 0.1 [mm] in the practical example. A chain line indicates a property of the scanning optical system with the coupling lens group (collimating lens group) decentered from the optical axis of the entire system by 0.1 [mm] in the comparison example.

As shown in FIG. 5, when the coupling lens group is decentered, the scanning optical system 10 in the practical example has a property closer to the ideal property than the comparison example. More specifically, the amount of defocus in the main scanning direction at an image height of 0 [mm] in the practical example is 2.45 [mm], which is smaller than 2.75 [mm] in the comparison example.

Hereinabove, the embodiment according to aspects of the present invention has been described. However, the present invention is not limited to the aforementioned embodiment. Various sorts of modifications may be possible as far as they are within such a scope as not to extend beyond essential teachings of the present invention.

For example, although the polygon mirror is employed as a deflector in the aforementioned embodiment, a galvanometer mirror to deflect laser light with micro-vibration may be used as a deflector. In this case, since the aforementioned parameter φ is always identical to zero, a scanning optical system which always satisfies the condition (3) can be provided.

The present disclosure relates to the subject matter contained in Japanese Patent Application No. P2007-091294, filed on Mar. 30, 2007, which is expressly incorporated herein by reference in its entirety.

What is claimed is:

1. A scanning optical system configured to scan laser light on a scanned surface in a predetermined scanning direction, comprising:

a light source configured to emit the laser light;

a converging element configured to converge the laser light emitted by the light source in the predetermined scanning direction;

a deflector configured to deflect the laser light converged by the converging element so as to scan the laser light on the scanned surface in the predetermined scanning direction; and a scanning speed controlling element configured to control the laser light deflected by the deflector to be scanned on the scanned surface at a constant scanning speed, wherein the scanning optical system is configured to satisfy conditions (1) and (2):

$$f > -K/M \qquad (1)$$

$$\frac{W}{2\sin\alpha} > f(2 - M/m) - K/m > \frac{dW}{2K\sin\alpha} \qquad (2)$$

where f represents a focal length of the converging element,

K represents a scanning coefficient of the scanning speed controlling element,

M represents a magnification of the scanning optical system in the predetermined scanning direction, W represents a scanning width of the laser light on the scanned surface, α represents an angle, on a scanning plane of the laser light deflected by the deflector in the predetermined scanning direction, between an optical axis of optical elements provided between the light source and deflector and the optical axis of the scanning speed controlling element, m represents a magnification of the scanning speed controlling element in the predetermined scanning direction, and d represents a distance from the deflector to the scanning speed controlling element.

2. The scanning optical system according to claim 1, which is configured to satisfy a condition (3):

$$-0.01 < \frac{\Delta}{H} < 0.01 \tag{3}$$

wherein $\Delta$ represents a shift amount of a deflection point at the deflector determined by an equation:

$$\Delta = \frac{\varphi \sin\alpha}{2}\left\{\frac{1}{\cos\left(\frac{\alpha}{2}\right)} - \frac{1}{\cos\left(\frac{\alpha}{2} + \frac{W}{4K}\right)}\right\}, \text{ and}$$

H represents a distance from the optical axis of the scanning speed controlling element to a farther end of a scanning trajectory of an imaging point of the converged light deflected by the deflector in the main scanning plane, the imaging point being defined under an assumption that the converged light is not transmitted through the scanning speed controlling element, the distance being determined by an equation:

$$H = \frac{K\sin\left(\frac{W}{2K}\right)}{m}, \text{ and}$$

wherein $\varphi$ represents a diameter of an inscribed circle of the deflector.

3. The scanning optical system according to claim 1, which is configured to satisfy conditions (4) and (5):

$$0 < m < 0.5 \tag{4}$$

$$K > W/2 \tag{5}$$

4. The scanning optical system according to claim 2, which is configured to satisfy conditions (4) and (5):

$$0 < m < 0.5 \tag{4}$$

$$K > W/2 \tag{5}$$

5. The scanning optical system according to claim 1, wherein the light source includes a chip and a plurality of laser emitters arranged on the chip away from each other in the predetermined scanning direction.

6. The scanning optical system according to claim 2, wherein the light source includes a chip and a plurality of laser emitters arranged on the chip away from each other in the predetermined scanning direction.

7. The scanning optical system according to claim 3, wherein the light source includes a chip and a plurality of laser emitters arranged on the chip away from each other in the predetermined scanning direction.

8. The scanning optical system according to claim 4, wherein the light source includes a chip and a plurality of laser emitters arranged on the chip away from each other in the predetermined scanning direction.

9. The scanning optical system according to claim 1, wherein the converging element includes a converging lens group.

10. The scanning optical system according to claim 1, wherein the scanning speed controlling element includes a scanning speed controlling lens group.

* * * * *